(12) United States Patent
Park et al.

(10) Patent No.: US 11,754,176 B2
(45) Date of Patent: Sep. 12, 2023

(54) CONTROL METHOD AND APPARATUS FOR PROTECTING DAMPER CLUTCH OF VEHICLE

(71) Applicant: Hyundai Kefico Corporation, Gyeonggi-do (KR)

(72) Inventors: Sung-Hyun Park, Gyeonggi-do (KR); Se-Hoon Son, Gyeonggi-do (KR); John-Ha Lee, Gyeonggi-do (KR); Nam-Hoon Kim, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 0 days.

(21) Appl. No.: 17/983,912

(22) Filed: Nov. 9, 2022

(65) Prior Publication Data

US 2023/0146695 A1 May 11, 2023

(30) Foreign Application Priority Data

Nov. 10, 2021 (KR) .......................... 10-2021-0154140

(51) Int. Cl.
*F16H 61/14* (2006.01)
*F16H 45/02* (2006.01)

(52) U.S. Cl.
CPC .......... *F16H 61/143* (2013.01); *F16H 45/02* (2013.01); *F16H 2045/0221* (2013.01); *F16H 2061/145* (2013.01)

(58) Field of Classification Search
CPC ............ F16H 45/02; F16H 2045/0221; F16H 2061/145; F16H 61/14–148; F16D 48/06; B60W 2510/02–0275
See application file for complete search history.

(56) References Cited

U.S. PATENT DOCUMENTS 8,548,704 B2 * 10/2013 Oue ..................... F16H 61/143
477/64
2018/0179970 A1 * 6/2018 Serrano ............... B60W 10/023
(Continued)

FOREIGN PATENT DOCUMENTS

JP 2007-001425 A 1/2007
JP 2009-234563 A 10/2009
(Continued)

OTHER PUBLICATIONS

Notice of Allowance dated Jan. 9, 2023 in corresponding Korean Application No. 10-2021-0154140.

*Primary Examiner* — Tinh Dang
(74) *Attorney, Agent, or Firm* — Fox Rothschild LLP (57) ABSTRACT

In one aspect, a control method and a control apparatus are provided for protecting a damper clutch of a vehicle. In one aspect, the control method of protecting the damper clutch of the vehicle includes determining whether a vehicle state satisfies a condition for operating a damper clutch protection logic, calculating a slip power in real time on the basis of a turbine speed of a torque converter, an engine speed, a capacity coefficient of the torque converter, a clutch torque, and a hydraulic torque when the condition for operating the damper clutch protection logic is satisfied, determining whether a repetitive tip-in/tip-out that is intentionally performed occurs or not on the basis of a change in the slip power that is calculated in real time for a set time, and operating the damper clutch protection logic for restraining a slip of the damper clutch when there is the repetitive tip-in/tip-out that is intentionally performed.

20 Claims, 4 Drawing Sheets

(56) References Cited

U.S. PATENT DOCUMENTS

| | | | |
|---|---|---|---|
| 2018/0202545 A1* | 7/2018 | Zhao | B60W 10/08 |
| 2018/0244276 A1* | 8/2018 | Imamura | B60W 30/20 |
| 2020/0256459 A1* | 8/2020 | Zavala Jurado | F16H 61/143 |

FOREIGN PATENT DOCUMENTS

| | | |
|---|---|---|
| JP | 2010-167885 A | 8/2010 |
| JP | 2012-091603 A | 5/2012 |
| KR | 2009-0124422 A | 12/2009 |
| KR | 10-2018-0067783 A | 6/2018 |
| KR | 10-2019606 B1 | 9/2019 |
| KR | 10-2020-0103207 A | 9/2020 |
| KR | 10-2244551 B1 | 4/2021 |

* cited by examiner

CONTROL METHOD AND APPARATUS FOR PROTECTING DAMPER CLUTCH OF VEHICLE

CROSS REFERENCE TO RELATED APPLICATION

The present application claims priority to Korean Patent Application No. 10-2021-0154140, filed Nov. 10, 2021, the entire contents of which are incorporated herein for all purposes by this reference.

FIELD

The present disclosure relates to a control method and a control apparatus for protecting a damper clutch. More particularly, the present disclosure relates to a control method and a control apparatus for protecting a damper clutch of a vehicle, the control method and the control apparatus being configured to prevent overheating of the damper clutch occurring when an action in which an accelerator pedal is intentionally pressed and then is depressed within a short time is repeatedly performed according to a driver's tendency.

BACKGROUND

A damper clutch as a mechanical apparatus for preventing power loss caused by hydraulic pressure is mounted in an inner portion of an automatic transmission by directly connecting a hydraulic clutch to a flywheel at an engine side. The damper clutch directly connects a pump side and a turbine side of a torque converter to each other when a speed of a vehicle is equal to or more than a predetermined speed, thereby serving to prevent power loss caused by a rotational speed difference between the pump side and the turbine side and to prevent a reduction in fuel efficiency accordingly.

Such a damper clutch is operated by being controlled by a Transmission Control Unit (TCU). The TCU is configured to determine whether to enter the damper clutch in an operation area on the basis of an accelerator pedal displacement and a turbine rotational speed in a current driving condition, an engine rotational speed, an input torque and a slip ratio (a value obtained by subtracting the turbine rotational speed (a rotational speed at an input side of the transmission) from the engine rotational speed or a pump rotational speed).

When the current driving condition of the vehicle matches with a condition for entering a damper clutch operation area, the TCU determines an initial duty value (DS) by using a duty map including the calculate input torque as a factor. Then, by using the determined duty value, a solenoid valve for the damper clutch is operated, and the damper clutch is operated.

For reference, the operation area of the damper clutch may be distinguished mainly into four sections such as an open (release) area, a coasting area, a slip area, and a direct connection area. In the four sections, the open area is an area where a power transmission through the damper clutch is completely released, and the direct connection area is an area where the damper clutch is completely coupled conversely and the pump side and the turbine side of the torque converter are completely synchronized.

Meanwhile, in the areas such as the coasting area and the slip area where the damper clutch is not fully open or coupled, slip occurs. Furthermore, when the size of slip of the damper clutch occurring as described above exceeds a set tolerance range or a duration time of the slip exceeds a predetermined time, the overheating of the damper clutch may occur and the damper clutch may be damaged.

Therefore, a technology of protecting the damper clutch from the overheating due to the slip by controlling a damper solenoid duty has been proposed, in which a slip power and a duration time of the slip is calculated on the basis of a turbine speed of a torque converter, an engine speed, a capacity coefficient of the torque converter, a clutch torque, a hydraulic torque, and so on, and the damper clutch is protected when the slip power and the duration time of the slip exceed a set reference value that corresponds to the slip power and the duration time of the slip.

However, such a damper clutch protection technology is difficult to respond to the slip caused by a tip-in/tip-out (an action in which a driver intentionally and repetitively presses an accelerator pedal and then depresses the accelerator pedal within a short time) that may frequently occur according to a traffic situation, a road condition, and the driver's tendency. Therefore, a technology of protecting a damper clutch in an excessive tip-in/tip-out situation is required to be developed.

SUMMARY

In one aspect, a control method and a control apparatus are provided which can protect a damper clutch of a vehicle, preferably the control method and the control apparatus being capable of determining a repetitive tip-in(an action of pressing an accelerator pedal to realize acceleration)/tip-out (an action of depressing the accelerator pedal to release the acceleration) intentionally performed by a driver, and the control method and the control apparatus preferably being capable of preventing an overheating of the damper clutch in a situation in which the repetitive tip-in/tip-out occurs.

In one aspect, a control method is provided, the method comprising: (a) determining via a controller whether a vehicle state satisfies a condition for operating a damper clutch protection logic; (b) calculating via a controller a slip power in real time on the basis of a turbine speed of a torque converter, an engine speed, a capacity coefficient of the torque converter, a clutch torque, and a hydraulic torque when the condition for operating the damper clutch protection logic is satisfied; (c) determining via a controller whether the repetitive tip-in/tip-out that is intentionally performed occurs or not on the basis of a change in the slip power that is calculated in real time for a set time; and (d) operating via a controller the damper clutch protection logic for restraining a slip of the damper clutch when there is the repetitive tip-in/tip-out that is intentionally performed.

In one aspect a control method is provided for protecting a damper clutch of a vehicle from a repetitive tip-in(an action of pressing an accelerator pedal to realize acceleration)/tip-out(an action of depressing the accelerator pedal to release the acceleration), the control method including: (a) determining whether a vehicle state satisfies a condition for operating a damper clutch protection logic; (b) calculating a slip power in real time on the basis of a turbine speed of a torque converter, an engine speed, a capacity coefficient of the torque converter, a clutch torque, and a hydraulic torque when the condition for operating the damper clutch protection logic is satisfied; (c) determining whether the repetitive tip-in/tip-out that is intentionally performed occurs or not on the basis of a change in the slip power that is calculated in real time for a set time; and (d) operating the damper clutch protection logic for restraining a slip of the damper clutch when there is the repetitive tip-in/tip-out that is intentionally performed.

Preferably, in the (a), when a duty applied to a solenoid for the damper clutch is equal to or more than a reference duty that is set differently according to a gear level of a transmission, it may be determined that the condition for operating the damper clutch protection logic is satisfied.

In addition, the (c) step may include: (c-1) monitoring whether the slip power calculated in real time exceeds a first reference value that is set and then the slip power falls below a second reference value that is lower than the first reference value; (c-2) counting and recording a moment when the slip power falls below the second reference value after the slip power exceeds the first reference value; and (c-3) comparing a sum of a count accumulated during a first set time to a set reference value after the first set time has elapsed.

In certain aspects, at this time, when the sum of the count accumulated during the first set time is equal to or more than the set reference value, it may be determined that the repetitive tip-in/tip-out is intentionally performed by a driver.

In certain aspects, in addition, when the first set time has elapsed, real time count data in data related to a recorded count may be reset.

In certain aspects, in addition, only the slip (a situation in which the slip power exceeds the first reference value and then falls below the second reference value) generated in a period equal to or shorter than a second set time that is shorter than the first set time may be counted and recorded.

In certain aspects, in addition, the damper clutch protection logic may be configured such that a duty correction value corresponding to a current operation area of the damper clutch and a current clutch torque is determined from a duty correction map in which the duty correction value for each operation area of the damper clutch and for each clutch torque is stored, then a duty value is increased by reflecting the duty correction value that is determined, and then an operation of a solenoid for the damper clutch is controlled by the duty value that is increased, thereby increasing hydraulic pressure applied to the damper clutch.

Preferably, when the duty correction value is determined, the damper clutch protection logic may check a history of a duty correction performance previously performed for the repetitive tip-in/tip-out that is intentionally performed, and then the damper clutch protection logic may control the solenoid for the damper clutch in different aspects according to whether the duty correction performance is performed.

Preferably, when there is an initial correction in which the history of the duty correction performance does not exist previously, the duty value for controlling the solenoid for the damper clutch may be gradually increased to the duty value that is increased, thereby reducing a shift impact caused by a sudden engagement of the damper clutch.

In contrast, when the history of the duty correction performance exists previously, in certain aspects, a process of additionally checking whether a control section of the damper clutch is in an operation area changing section may be performed. Furthermore, when the control section is not in the operation area changing section, the duty value for controlling the solenoid for the damper clutch may be immediately increased to the duty value that is increased. Furthermore, when the control section is in the operation area changing section, the duty value for controlling the solenoid for the damper clutch may be gradually increased to the duty value that is increased, thereby reducing a shift impact caused by a sudden engagement of the damper clutch.

In order to achieve the objectives, according to another aspect of the present disclosure, there is provided a control apparatus for protecting a damper clutch of a vehicle from a repetitive tip-in(an action of pressing an accelerator pedal to realize or increase acceleration)/tip-out(an action of depressing the accelerator pedal to release the acceleration), the control apparatus including: a solenoid for the damper clutch, the solenoid being configured to control an operation of the damper clutch; and a Transmission Control Unit (TCU) configured to control a transmission and the solenoid for the damper clutch by cooperating with an Engine Control Unit (ECU), wherein the TCU may include: a slip power calculation unit configured to calculate a slip power in real time on the basis of a turbine speed of a torque converter, an engine speed, a capacity coefficient of the torque converter, a clutch torque, and a hydraulic torque; an intention determination unit configured to determine whether the repetitive tip-in/tip-out that is intentionally performed occurs or not on the basis of a change in the slip power that is calculated in real time by the slip power calculation unit; and a protection logic operation unit configured to operate a damper clutch protection logic set to restrain a slip of the damper clutch by increasing a hydraulic pressure applied to the damper clutch when it is determined that the repetitive tip-in/tip-out that is intentionally performed occurs.

Here, the TCU may further include a condition determination unit configured to determine whether a vehicle state satisfies a condition for operating the damper clutch protection logic. At this time, the condition determination unit may be configured to determine that the condition for operating the damper clutch protection logic is satisfied when a duty applied to the solenoid for the damper clutch is equal to or more than a reference duty that is set differently according to a gear level of the transmission.

In addition, the intention determination unit may suitably include: a slip count unit configured to count a moment when the slip power calculated in real time exceeds a first reference value and then falls below a second reference value, the slip count unit being configured to record the moment on a dedicated recording medium; and a comparison unit configured to determine whether the repetitive tip-in/tip-out that is intentionally performed occurs or not by comparing a sum of a count accumulated during a first set time to a set reference value when the first set time has elapsed.

At this time, when the sum of the count accumulated during the first set time is equal to or more than the set reference value, the comparison unit may be configured to determine that the repetitive tip-in/tip-out is intentionally performed by a driver.

In certain aspects, in addition, when the first set time has elapsed, the slip count unit may be configured to reset real time count data in data related to a recorded count.

In certain aspects, in addition, the slip count unit may be configured to only count and record the slip (a situation in which the slip power exceeds the first reference value and then falls below the second reference value) generated in a period equal to or shorter than a second set time that is shorter than the first set time.

In certain aspects, in addition, the damper clutch protection logic may be configured such that a duty correction value corresponding to a current operation area of the damper clutch and a current clutch torque is determined from a duty correction map in which the duty correction value for each operation area of the damper clutch and for each clutch torque is stored, then a duty value is increased by reflecting the duty correction value that is determined, and then an operation of the solenoid for the damper clutch is controlled by the duty value that is increased, thereby increasing the hydraulic pressure applied to the damper clutch.

Preferably, when the duty correction value is determined, the damper clutch protection logic may check a history of a duty correction performance previously performed for the repetitive tip-in/tip-out that is intentionally performed, and then the damper clutch protection logic may control the solenoid for the damper clutch in different aspects according to whether the duty correction performance is performed.

Preferably, when there is an initial correction in which the history of the duty correction performance does not exist previously, the duty value for controlling the solenoid for the damper clutch may be gradually increased to the duty value that is increased, thereby reducing an impact caused by a sudden engagement of the damper clutch.

In contrast, when the history of the duty correction performance exists previously, a process of additionally checking whether a control section of the damper clutch is in an operation area changing section may be performed. Furthermore, in certain aspects, when the control section is not in the operation area changing section, the duty value for controlling the solenoid for the damper clutch may be immediately increased to the duty value that is increased. Furthermore, when the control section is in the operation area changing section, the duty value for controlling the solenoid for the damper clutch may be gradually increased to the duty value that is increased, thereby reducing an impact caused by a sudden engagement of the damper clutch.

According to the present disclosure as described above, when the intentional and repeated tip-in/tip-out is performed by the driver, the damper clutch is configured to be in the directly connected state or the state close to the directly connected state so that the protection logic restraining the slip is operated. Therefore, the overheating of the damper clutch caused by the excessive tip-in/tip-out in/tip-out may be prevented, so that the damage to the damper clutch caused by the overheating of the damper clutch may be prevented and a life extension effect may be realized.

In addition, when there is the history of the duty correction performance previously and the operation area of the damper clutch is in the operation area changing section while the protection logic is performed, the duty value for controlling the solenoid for the damper clutch is gradually increased to the increased duty (existing duty+duty correction value) in which the correction value is reflected, so that an increased shift effect may be provided since the disharmony caused by the protection logic operation is reduced.

As discussed, the method and system suitably include use of controller or processer.

In another embodiment, vehicles are provided that comprise an apparatus or system as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, an exemplary embodiment of the present disclosure will be described in detail with reference to the accompanying drawings.

In describing the present disclosure, the terms used in the present specification are only used to describe specific embodiments, and are not intended to limit the present disclosure. Singular expressions include plural expressions unless the context clearly indicates otherwise.

In addition, it is to be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

In addition, terms "first", "second", etc. can be used to describe various elements, but the elements are not to be construed as being limited to the terms. The terms are only used for the purpose of distinguishing one element from another element.

In addition, the terms " . . . part", " . . . unit", " . . . module" and the like described herein may mean a unit for processing at least one function or operation, and they may be implemented in hardware, software, or a combination of hardware and software.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the following description referring to the accompanying drawings, the same components are given the same reference numerals and are not repeatedly described. In describing the present disclosure, a detailed description of known technologies will be omitted when it may obscure the subject matter of the present disclosure.

A control apparatus for protecting a damper clutch of a vehicle according to an embodiment of the present disclosure will be described with reference to FIG. 2.

Figure 2:
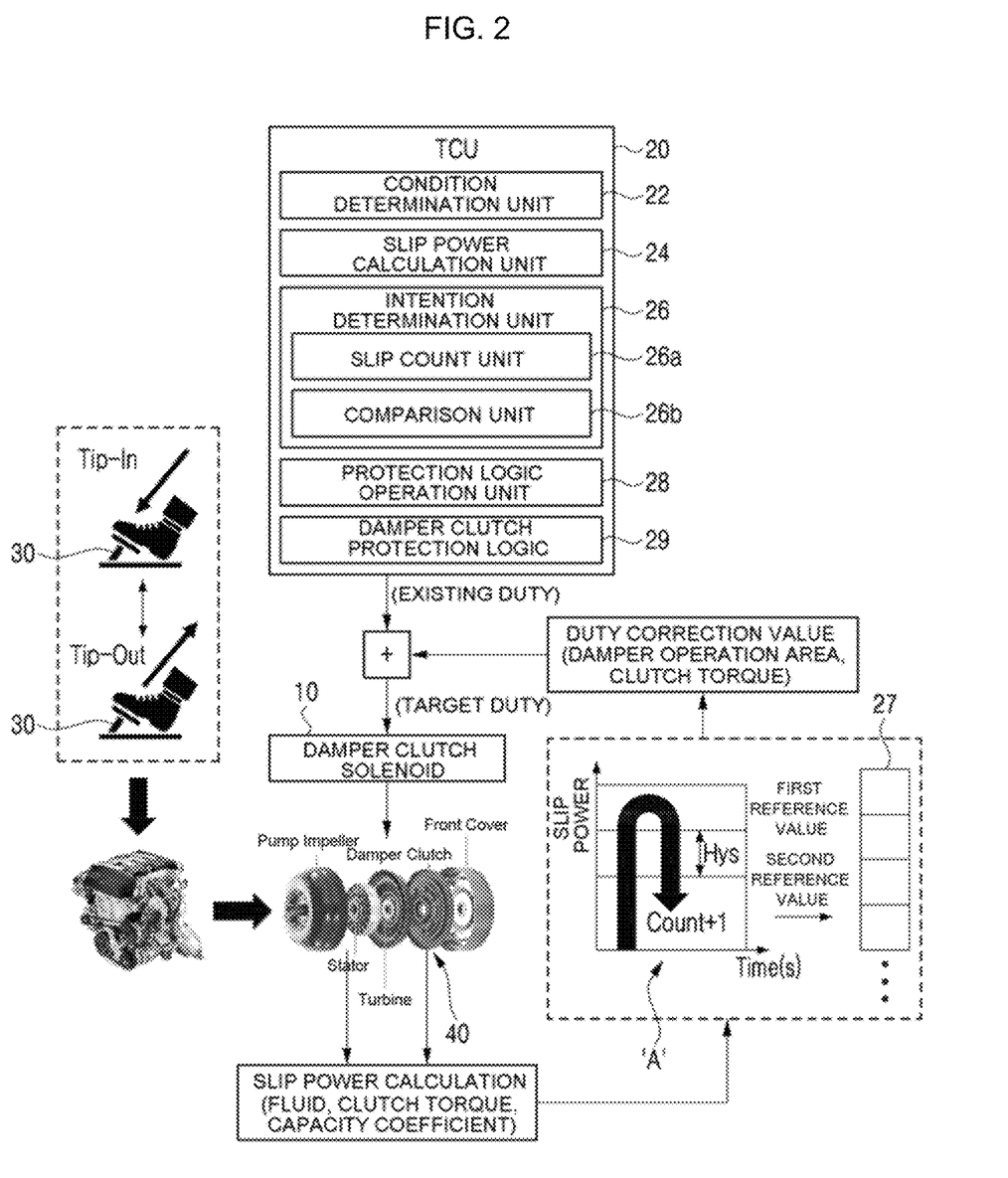
FIG. 2 is a view schematically illustrating a configuration of a control apparatus for protecting a damper clutch according to an embodiment of the present disclosure.

FIG. 2 is a view schematically illustrating a configuration of a control apparatus for protecting a damper clutch of a vehicle according to an embodiment of the present disclosure.

Referring to FIG. 2, the control apparatus for protecting the damper clutch of the vehicle according to an embodiment of the present disclosure includes a solenoid 10 for the damper clutch, and includes a Transmission Control Unit (TCU) 20, in which the solenoid 10 for the damper clutch and the TCU 20 are configured to prevent overheating of the damper clutch, the overheating of the damper clutch occurring in a situation in which an action that a driver intentionally presses an accelerator pedal 30 and then depresses the accelerator pedal 30 within a short period of time (hereinafter, referred to as 'tip-in/tip-out') is repeatedly performed.

The solenoid 10 for the damper clutch (hereinafter, referred to as 'solenoid' for convenience of the description) is configured to control an operation of the damper clutch by a control of the TCU 20. The TCU 20 cooperates with an Engine Control Unit (ECU) so as to control a transmission. Furthermore, in a situation in which the damper clutch is required to be operated, the TCU 20 is configured to control hydraulic pressure applied to the damper clutch 40 through the solenoid 10.

The TCU 20 suitably determines a duty suitable for a current vehicle driving condition in a duty map where a solenoid duty is stored, in which the solenoid duty is a control value for two factors that are a clutch torque and an operation area of the damper clutch. In addition, the solenoid 10 is controlled with the determined duty value such that an optimal hydraulic pressure capable of minimizing power loss under the current vehicle driving condition is capable of being applied to the damper clutch 40.

However, when the driver intentionally repeats the tip-in/tip-out, significant heat can be generated due to excessive slip of the damper clutch 40. As such, the heat generated by the intentional and excessive tip-in/tip-out of the driver can be a major cause of deteriorating a friction element of the damper clutch 40. Therefore, the larger the slip amount due to the excessive tip-in/tip-out, the larger the risk of a clutch damage and the rapidly shortened life of the clutch.

Therefore, the overheating of the damper clutch 40 due to the excessive slip caused by the intentionally repeated tip-in/tip-out is preferably reduced or prevented and thereby reducing damage potentially caused by the overheating of the damper clutch 40. Accordingly, in an embodiment, a plurality of processors is mounted in the TCU 20, in which the plurality of processors is operated by a program that is programed such that a series of processes are sequentially performed so that the damper clutch 40 is capable of being protected from the overheating caused by the excessive tip-in/tip-out process.

Preferably, the plurality of processors mounted in the TCU 20 so as to protect the damper clutch 40 from the overheating due to the excessive tip-in/tip-out may be a condition determination unit 22, a slip power calculation unit 24, an intention determination unit 26, and a protection logic operation unit 28. The condition determination unit 22 determines whether a vehicle state satisfies a condition for operating a damper clutch protection logic, and the slip power calculation unit 24 calculates a slip power in real time, the slip power being power loss due to the slip.

When the duty applied to the solenoid 10 is equal to or more than a reference duty set differently according to a gear level of the transmission, the condition determination unit 22 may determine such that a condition operating the damper clutch protection logic is satisfied. In addition, the slip power calculation unit 24 calculates the slip power in real time on the basis of a turbine speed of a torque converter, an engine speed, a capacity coefficient of the torque converter, a clutch torque, and a hydraulic torque.

For reference, when the slip occurs while the damper clutch of the torque converter is operated, the hydraulic torque (T_h), and the clutch torque (T_c) coexist in the torque converter, so that the engine torque (T_e) is the sum of the hydraulic torque (T_h) and the clutch torque (T_c).

Here, the hydraulic torque (T_h) is calculated from a correlation between the torque converter capacity coefficient (Cf) and the engine speed (N_e) that are determined according to a specification of the torque converter, and the clutch torque above (T_c) is calculated in consideration of a coefficient of friction of the clutch, a normal force applied to a friction surface, and an equivalent radius for the friction surface, so that the engine torque (T_e) may be summarized in the following relational expression.

Engine Torque (T_e)=Hydraulic Torque (T_h)+
Clutch Torque (T_c)

Engine torque (T_e)=Torque Converter Capacity
Coefficient (Cf)*Engine Speed (N_e)^2+Clutch
torque (T_c)

In addition, in consideration of the clutch torque (T_c) from the correlation between a torque ratio (tr) and the engine torque (T_e), a turbine torque (T_t) may be calculated by the following relational expression.

Turbine Torque (T_t)=Torque Ratio (tr)*Hydraulic
Torque (T_e)+Clutch Torque (T_c)

Therefore, when the slip occurs while the damper clutch of the torque converter is operated, the slip power (P_s) of the damper clutch of the torque converter may be calculated by the following relational expression.

Clutch slip power (T_s)=clutch torque (T_c)*Slip
Amount (dw)

={Engine Torque (T_e)−Hydraulic Torque (T_h)
}*Slip Amount (dw)

={Engine Torque (T_e)−[Torque Converter Capacity
Coefficient (Cf)*Engine Speed (N_e)^2]}*Slip
Amount (dw)

Here, the slip amount (dw) is a value obtained by subtracting the turbine speed that is an output side speed from the engine speed that is an input side speed (Slip Amount (dw)=Engine speed−Turbine speed).

In an embodiment, during a predetermined time, the slip power calculation unit 24 calculates the slip power in real time by using the relational expressions as described above, and the slip power calculated in real time is transmitted to the intention determination unit 26. In addition, in the intention determination unit 26, whether the slip occurring on the damper clutch from a change of the slip power calculated in real time from the slip power calculation unit 24 is the slip due to the repetitive tip-in/tip-out operation is determined.

The intention determination unit 26 suitably includes a slip count unit 26a. As illustrated in 'A' in FIG. 2, the slip count unit 26a recognizes the slip due to the tip-in/tip-out by counting a moment when the slip power exceeds a first reference value that is a set reference value and then the slip power falls below a second reference value that is lower than the first reference value as the slip due to the tip-in/tip-out, and records the slip on a dedicated recording medium 27. Here, the second reference value may be a value obtained by subtracting a user setting area (Hysteresis) from the first reference value.

More specifically, the slip count unit 26a determines that the tip-in/tip-out operation has occurred once when the change in the slip power calculated in real time and transmitted from the slip power calculation unit 24 changes in the same manner as in the 'A' described above. That is, when the change in the slip power having a pattern same as the 'A' in FIG. 2 is detected, the count is incremented by +1. Such a count process may be performed over a first set time.

For example, when the first set time is 20 seconds, the slip count unit 26a increments the count by +1 whenever the change in the slip power having the pattern same as the 'A' in FIG. 2 occurs for determined 20 seconds. In counting the change in the slip power having the pattern same as the 'A' in FIG. 2, the slip count unit 26a may only count and record a change in the slip power occurring at intervals equal to or less than a second set time that is less than the first set time.

For example, when the second set time is one second, the slip count unit 26a normally counts only when the change in the slip power having the pattern same as the 'A' in FIG. 2 occurs within one second. Furthermore, when the change in the slip power having the pattern same as the 'A' in FIG. 2 is detected but the time taken for the same pattern to occur exceeds one second, the slip count unit 26a determines that the change in the slip power is not due to the intended tip-in/tip-out operation, and the change in the slip power is excluded from the count.

Here, in count date recorded on the recording medium 27, it is preferable that real time count information is initialized and only cumulative count information is stored so that a storage space is secured. To this end, the slip count unit 26a may be configured such that real time count information in count data recorded on the recording medium 27 is initialized and only cumulative count information is stored when the first set time has elapsed.

Count information (information on the number of Tip-in/Tip-out operations) of the slip count unit 26a is transmitted to a comparison unit 26b constituting the intention determination unit 26. When the first set time has elapsed, the comparison unit 26b compares the sum of accumulated counts that the slip count unit 26a provides, i.e., the sum of accumulated counts for the first set time, and the comparison unit 26b determines whether the tip-in/tip-out intentionally repeated by the driver occurs.

Specifically, when the sum of the accumulated count for the first set time is equal to or more than a reference value that is preset, the comparison unit 26b may determine that the tip-in/tip-out intentionally repeated by the driver occurs. As such, a determination result from the comparison unit 26b is provided to the protection logic operation unit 28, and the protection logic operation unit 28 may determine whether to operate a dedicated logic for protecting the damper clutch (hereinafter, referred to as 'damper clutch protection logic') on the basis of the determination result.

Preferably, when the comparison unit 26b is determined that a current operation state of an accelerator pedal is in a situation in which the driver intentionally and repetitively operates the tip-in/tip-out, the protection logic operation unit 28 increases the hydraulic pressure applied to the damper clutch so that a damper clutch protection logic 29 set to restrain the slip of the damper clutch is operated, thereby preventing the overheating due to the occurrence of the excessive slip and the damage to a friction material accordingly.

Preferably, the damper clutch protection logic 29 may be programed such that a series of processes are sequentially performed, the series of processes being configured such that the damper clutch is in a directly connected state or in a state close to the directly connected state.

1. Determining a duty correction value (solenoid duty correction value) matching or corresponding to the operation area of the current damper clutch and the clutch torque from a duty correction map 2. Increasing a duty by reflecting the determined duty correction value 3. Increasing hydraulic pressure applied to the damper clutch by controlling the solenoid for the damper clutch to the duty that is increased Here, the 'duty correction map' is a map in which duty correction values are stored as different values for each operation area of the damper clutch and for each clutch torque. At this time, the duty correction value stored for each operation area of the damper clutch 40 and for each clutch torque are values derived by a repeated experiment or a simulation. Furthermore, according to the operation area of the damper clutch 40 and the clutch torque, the duty correction value may be determined as an optimal control value capable of effectively restraining the slip due to the tip-in/tip-out.

Specifically, when the duty correction value is determined from the duty correction map storing the duty correction values for each operation area of the damper clutch and for each clutch torque, the damper clutch protection logic 29 firstly checks a history of a duty correction performance for the intentionally repeated tip-in/tip-out. After then, according to whether the history of the duty correction performance previously exists or not, the solenoid 10 may be set such that the solenoid 10 is controlled in another aspect.

Preferably, when there is an initial duty correction in which the history of the duty correction performance does not exist previously, a duty value may be set such that the duty value is gradually increased to a duty in which a correction value is reflected (hereinafter, referred to as 'target duty'). That is for preventing a shift shock that may occur due to a sudden engagement of the damper clutch caused by a sudden hydraulic pressure increase, and is for reducing disharmony due to the protection logic operation, thereby providing a stable shift effect.

In contrast, where there is the history of the duty correction performance previously, whether a control section of the damper clutch is an operation area changing section is additionally checked. Furthermore, when the control section of the damper clutch is not the operation area changing section, the duty value for a solenoid control to the target duty is increased immediately. Furthermore, when the control section of the damper clutch is the operation area changing section, the duty value for controlling the operation of the solenoid 10 may be gradually increased to the target duty.

Here, preferably it is understood that the operation area changing section refers to a section in which a change excluding a direct connection area is performed between areas in the damper clutch operation area (see FIG. 1) distinguished into four sections that are an open (release) area, a coasting area, a slip area, and the direct connection area.

Figure 1:
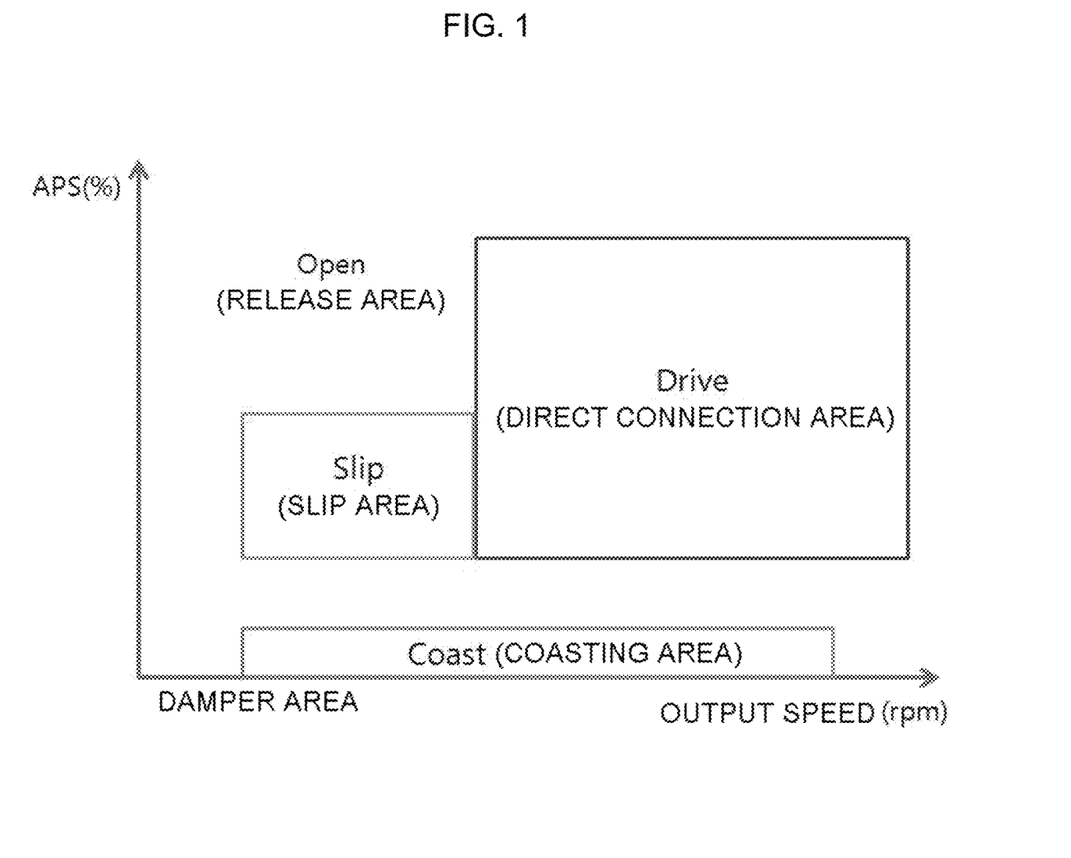
FIG. 1 is a graph illustrating an operation area of a conventional damper clutch.

For example, when a current operation state of the damper clutch is in a section in which a control area (or a control type) is changed from the open (release) area to the slip area or the current operation state of the damper clutch is in a section in which the control area is changed from the slip area to the coasting area, it is determined that the control area is in the operation area changing section, and the duty value for controlling the operation of the solenoid 10 may be gradually increased to the target duty.

Hereinafter, a control process performed by the control apparatus for protecting the damper clutch of the vehicle described above will be described in conjunction with the method for protecting the damper clutch of the vehicle according to the present disclosure.

Figure 3:
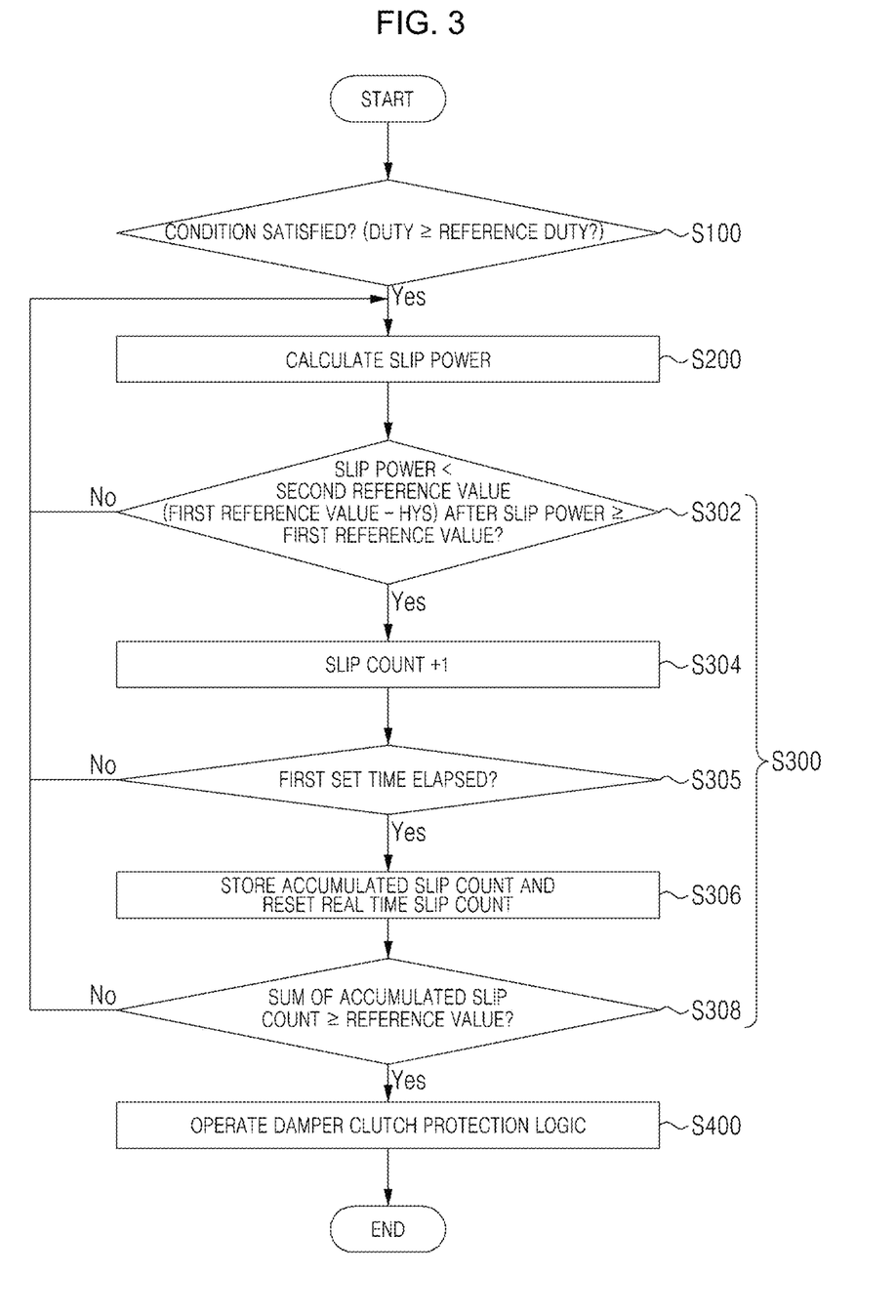
FIG. 3 is a flowchart illustrating a control method for protecting the damper clutch according to an embodiment of the present disclosure.

FIG. 3 is a flowchart illustrating a control method for protecting the damper clutch according to an embodiment of the present disclosure.

Referring to FIG. 3, in performing the control for protecting the damper clutch of the vehicle according to an embodiment of the present disclosure, whether a vehicle state satisfies a condition for operating the damper clutch protection logic is determined firstly (S100). Preferably, in S100, when a duty applied to the solenoid for the damper clutch is equal to or more than the reference duty set differently according to the gear level of the transmission, it is determined that the condition is satisfied.

When the condition for operating the damper clutch protection logic is satisfied, the slip power is calculated in real time on the basis of the turbine speed of the torque converter, the engine speed, the capacity coefficient of the torque converter, the clutch torque, the hydraulic torque (S200). Since a slip power calculation process was described above in detail, an overlapping description for the same calculation process will be omitted.

Next, a process in which whether the tip-in/tip-out operation intentionally repeated is performed is determined on the basis of the change in the slip power that is calculated in real time is performed (S300).

Specifically, in S300, whether the slip power calculated in real time exceeds the set first reference value and then falls below the second reference value that is lower than the first reference value is monitored (S302). Furthermore, when the slip power falls below the second reference value after the slip power exceeds the first reference value, it is determined that the driver intentionally performs the tip-in/tip-out operation, and the slip count is incremented by +1 at the same time, and the slip count is recorded on the recording medium (S304).

Next, whether the first set time that is predetermined has elapsed is determined (S305). As a result, when a counted time from when an initial slip power calculation is started has not yet reached the first set time, the process of S200 to S304 is repeated and the intentional tip-in/tip-out is continuously detected and counted. Furthermore, when the first set time has elapsed, the sum of the slip count accumulated for the first set time is compared to the set reference value (S308).

For example, when the first set time is 20 seconds, the slip count is incremented by +1 for each change in the slip power having the pattern same as the 'A' in FIG. 2 described above for determined 20 seconds. Here, in detecting the intentional tip-in/tip-out from the change in the slip power, the slip count may be incremented by +1 only when the change in the slip power generated in a period equal to or shorter than the second set time that is shorter than the first set time, and the slip count may be recorded on the recording medium.

For example, when the second set time is one second, the slip count is normally counted only when the change in the slip power has the pattern same as in FIG. 3 and the change pattern occurs within one second. Furthermore, when the change in the slip power having the pattern same as FIG. 3 is detected but the time for occurring the pattern exceeds one second, it is determined that the intended tip-in/tip-out is not occurring, and is excluded from the count.

Before comparing the sum of the accumulated slip count during the first set time to the set reference value (S308) after the first set time has elapsed, real time count information in count data that is recorded on the recording medium when the first set time has elapsed is reset and only accumulated count information is stored (S306) so as to secure the storage space. Then, the S308 process in which the sum of the slip count accumulated during the first set time to the set reference value is performed.

Specifically, in the S308 process, when the sum of the slip count accumulated during the first set time is equal to or more than the reference value that is predetermined, it may be determined that the tip-in/tip-out intentionally repeated by the driver is performed. Conversely, when the sum of the slip count accumulated during the first set time does not reach the set reference value, it is determined that the tip-in/tip-out is not sufficient to cause the overheating of the damper clutch, and the process is returned to the S200 process and the after process is performed again.

In the S308 process, when it is determined that the tip-in/tip-out is intentionally repeated by the driver, i.e., the sum of the slip count accumulated during the first set time is equal to or more than the reference value that is predetermined, the damper clutch protection logic for restraining the slip of the damper clutch is performed at the same time since the excessive slip of the damper clutch caused by the excessive tip-in/tip-out may adversely affect the friction element of the damper clutch.

Figure 4:
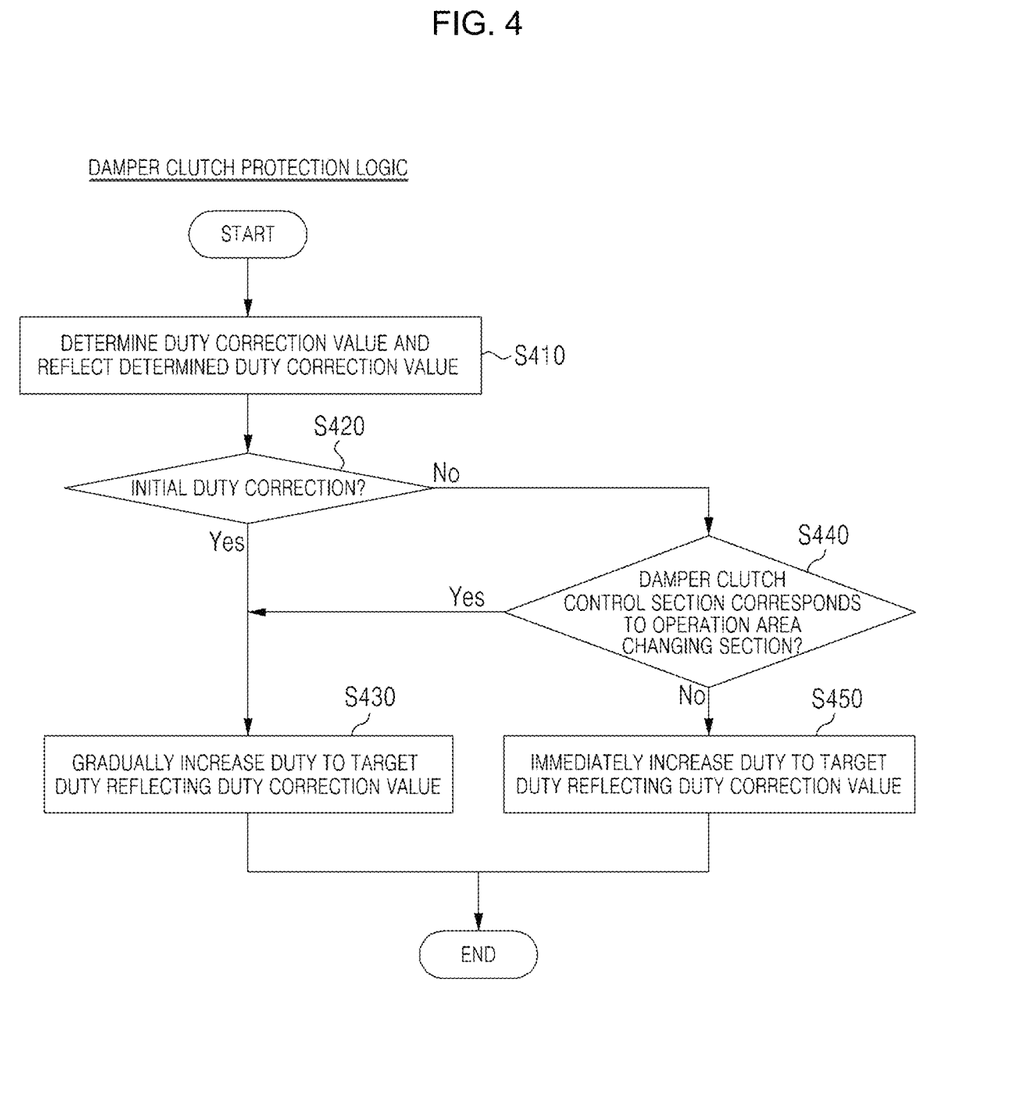
FIG. 4 is a flowchart illustrating a series of processes for protecting the damper clutch, the series of processes being performed when a damper clutch protection logic is operated.

FIG. 4 is a flowchart illustrating a series of processes for protecting the damper clutch, the series of processes being performed when a damper clutch protection logic is operated.

Referring to FIG. 4, when the damper clutch protection logic is operated, the duty correction value (solenoid duty correction value) matching or corresponding to the current operation area of the damper clutch is determined from the duty correction map, and the determined duty correction value is reflected and the duty is increased (S410). Then, a process of checking whether the history of the duty correction performance for the intentionally repeated tip-in/tip-out exists is performed (S420).

By checking the result of the history, when there is the initial correction in which the history of the duty correction performance does not exist previously, the duty value for controlling the solenoid for the damper clutch is gradually increased to the increased duty, so that the shift shock that may occur due to the sudden engagement of the damper clutch caused by the sudden increase of the hydraulic pressure is prevented. That is, the reduction in the shift effect is prevented by reducing the disharmony due to the protection logic operation.

On the other hand, when the history of the duty correction performance exists previously, a process (S400) of additionally checking whether the control section of the damper clutch is in the operation area changing section is performed.

As a result of the process S440, when the damper clutch control section is not in the operation area changing section, the duty value for controlling the solenoid for the damper clutch is increased to the increased duty immediately (S450). Furthermore, when the damper clutch control section is in the operation area changing section, the process is changed to the S430 process in which the duty value for controlling the solenoid for the damper clutch is gradually increased to the increased duty.

For reference, as described above, it is understood that the change in the operation area refers to the control section in which the change excluding the direct connection area is performed between areas in the damper clutch operation area (see FIG. 1) distinguished into four sections that are the open (release) area, the coasting area, the slip area, and the direct connection area.

For example, when the current operation state of the damper clutch is in the section in which the control area (or the control type) is changed from the open (release) area to the slip area or the current operation state of the damper clutch is in the section in which the control area is changed from the slip area to the coasting area, it is determined that the control area is in the operation area changing section, and the duty value for controlling the solenoid for the damper clutch may be gradually increased to the increased duty.

According to the present disclosure as described above, when the intentional and repeated tip-in/tip-out is performed by the driver, the damper clutch is configured to be in the directly connected state or the state close to the directly connected state so that the protection logic restraining the slip is operated. Therefore, the overheating of the damper clutch caused by the excessive tip-in/tip-out may be prevented, so that the damage to the damper clutch caused by the overheating of the damper clutch may be prevented and a life extension effect may be realized.

In addition, when there is the history of the duty correction performance previously and the operation area of the damper clutch is in the operation area changing section while the protection logic is performed, the duty value for controlling the solenoid for the damper clutch is gradually increased to the increased duty (existing duty+duty correction value) in which the correction value is reflected, so that more increased shift effect may be provided since the disharmony caused by the protection logic operation is reduced.

In the detailed description of the present disclosure described above, only a specific embodiment was described. However, the present disclosure should not be construed as being limited to the specific embodiment described above, but should be construed as including all changes, equivalents, and substitutions within the spirit of the present disclosure defined in the claims.

What is claimed is:

1. A control apparatus for protecting a damper clutch of a vehicle from a repetitive tip-in (an action of pressing an accelerator pedal to realize acceleration)/tip-out (an action of depressing the accelerator pedal to release the acceleration), the control apparatus comprising:
   a solenoid for the damper clutch, the solenoid being configured to control an operation of the damper clutch; and
   a Transmission Control Unit (TCU) configured to control a transmission and the solenoid for the damper clutch by cooperating with an Engine Control Unit (ECU), wherein the TCU comprises:
   a slip power calculation unit configured to calculate a slip power in real time on the basis of a turbine speed of a torque converter, an engine speed, a capacity coefficient of the torque converter, a clutch torque, and a hydraulic torque;
   an intention determination unit configured to determine whether the repetitive tip-in/tip-out that is intentionally performed occurs or not on the basis of a change in the slip power that is calculated in real time for a set time by the slip power calculation unit; and
   a protection logic operation unit configured to operate a damper clutch protection logic set to restrain a slip of the damper clutch by increasing hydraulic pressure applied to the damper clutch when it is determined that the repetitive tip-in/tip-out that is intentionally performed occurs.

2. The control method of claim 1, wherein, in the (a) determining step, when a duty applied to a solenoid for the damper clutch is equal to or more than a reference duty that is set differently according to a gear level of a transmission, it is determined that the condition for operating the damper clutch protection logic is satisfied.

3. The control method of claim 1, wherein the (c) determining step comprises:
   (c-1) monitoring via a controller whether the slip power calculated in real time exceeds a first reference value that is set and then the slip power falls below a second reference value that is lower than the first reference value;

(c-2) counting and recording via a controller a moment when the slip power falls below the second reference value after the slip power exceeds the first reference value; and (c-3) comparing via a controller a sum of a count accumulated during a first set time to a set reference value after the first set time has elapsed.

4. The control method of claim 3, wherein when the sum of the count accumulated during the first set time is equal to or more than the set reference value, it is determined that the repetitive tip-in/tip-out is intentionally performed by a driver.

5. The control method of claim 3, wherein when the first set time has elapsed, real time count data in data related to a recorded count is reset.

6. The control method of claim 3, wherein only the slip (a situation in which the slip power exceeds the first reference value and then falls below the second reference value) generated in a period equal to or shorter than a second set time that is shorter than the first set time is counted and recorded.

7. The control method of claim 1, wherein the damper clutch protection logic is configured such that a duty correction value corresponding to a current operation area of the damper clutch and a current clutch torque is determined from a duty correction map in which the duty correction value for each operation area of the damper clutch and for each clutch torque is stored, then a duty value is increased by reflecting the duty correction value that is determined, and then an operation of a solenoid for the damper clutch is controlled by the duty value that is increased, thereby increasing hydraulic pressure applied to the damper clutch.

8. The control method of claim 7, wherein when the duty correction value is determined, the damper clutch protection logic checks a history of a duty correction performance previously performed for the repetitive tip-in/tip-out that is intentionally performed, and then the damper clutch protection logic controls the solenoid for the damper clutch in different aspects according to whether the duty correction performance is performed.

9. The control method of claim 8, wherein when there is an initial correction in which the history of the duty correction performance does not exist previously, the duty value for controlling the solenoid for the damper clutch is gradually increased to the duty value that is increased, thereby reducing a shift impact caused by a sudden engagement of the damper clutch.

10. The control method of claim 8, wherein,
when the history of the duty correction performance exists previously, a process of additionally checking whether a control section of the damper clutch is in an operation area changing section is performed,
when the control section is not in the operation area changing section, the duty value for controlling the solenoid for the damper clutch is immediately increased to the duty value that is increased, and
when the control section is in the operation area changing section, the duty value for controlling the solenoid for the damper clutch is gradually increased to the duty value that is increased, thereby reducing a shift impact caused by a sudden engagement of the damper clutch.

11. A control apparatus for protecting a damper clutch of a vehicle from a repetitive tip-in (an action of pressing an accelerator pedal to realize acceleration)/tip-out(an action of depressing the accelerator pedal to release the acceleration), the control apparatus comprising:

a solenoid for the damper clutch, the solenoid being configured to control an operation of the damper clutch; and a Transmission Control Unit (TCU) configured to control a transmission and the solenoid for the damper clutch by cooperating with an Engine Control Unit (ECU), wherein the TCU comprises:

a slip power calculation unit configured to calculate a slip power in real time on the basis of a turbine speed of a torque converter, an engine speed, a capacity coefficient of the torque converter, a clutch torque, and a hydraulic torque;

an intention determination unit configured to determine whether the repetitive tip-in/tip-out that is intentionally performed occurs or not on the basis of a change in the slip power that is calculated in real time for a set time by the slip power calculation unit; and a protection logic operation unit configured to operate a damper clutch protection logic set to restrain a slip of the damper clutch by increasing hydraulic pressure applied to the damper clutch when it is determined that the repetitive tip-in/tip-out that is intentionally performed occurs.

12. The control apparatus of claim 11, wherein the TCU further comprises a condition determination unit configured to determine whether a vehicle state satisfies a condition for operating the damper clutch protection logic, and the condition determination unit is configured to determine that the condition for operating the damper clutch protection logic is satisfied when a duty applied to the solenoid for the damper clutch is equal to or more than a reference duty that is set differently according to a gear level of the transmission.

13. The control apparatus of claim 11, wherein the intention determination unit comprises:

a slip count unit configured to count a moment when the slip power calculated in real time exceeds a first reference value and then falls below a second reference value, the slip count unit being configured to record the moment on a dedicated recording medium; and a comparison unit configured to determine whether the repetitive tip-in/tip-out that is intentionally performed occurs or not by comparing a sum of a count accumulated during a first set time to a set reference value when the first set time has elapsed.

14. The control apparatus of claim 13, wherein when the sum of the count accumulated during the first set time is equal to or more than the set reference value, the comparison unit is configured to determine that the repetitive tip-in/tip-out is intentionally performed by a driver.

15. The control apparatus of claim 13, wherein when the first set time has elapsed, the slip count unit is configured to reset real time count data in data related to a recorded count.

16. The control apparatus of claim 13, wherein the slip count unit is configured to only count and record the slip (a situation in which the slip power exceeds the first reference value and then falls below the second reference value) generated in a period equal to or shorter than a second set time that is shorter than the first set time.

17. The control apparatus of claim 11, wherein the damper clutch protection logic is configured such that a duty correction value corresponding to a current operation area of the damper clutch and a current clutch torque is determined from a duty correction map in which the duty correction value for each operation area of the damper clutch and for each clutch torque is stored, then a duty value is increased by reflecting the duty correction value that is determined, and then an operation of the solenoid for the damper clutch is controlled by the duty value that is increased, thereby increasing the hydraulic pressure applied to the damper clutch.

18. The control apparatus of claim 17, wherein when the duty correction value is determined, the damper clutch protection logic checks a history of a duty correction performance previously performed for the repetitive tip-in/tip-out that is intentionally performed, and then the damper clutch protection logic controls the solenoid for the damper clutch in different aspects according to whether the duty correction performance is performed.

19. The control apparatus of claim 18, wherein when there is an initial correction in which the history of the duty correction performance does not exist previously, the duty value for controlling the solenoid for the damper clutch is gradually increased to the duty value that is increased, thereby reducing an impact caused by a sudden engagement of the damper clutch.

20. The control apparatus of claim 18, wherein,
when the history of the duty correction performance exists previously, a process of additionally checking whether a control section of the damper clutch is in an operation area changing section is performed,
when the control section is not in the operation area changing section, the duty value for controlling the solenoid for the damper clutch is immediately increased to the duty value that is increased, and
when the control section is in the operation area changing section, the duty value for controlling the solenoid for the damper clutch is gradually increased to the duty value that is increased, thereby reducing an impact caused by a sudden engagement of the damper clutch.

* * * * *